US006624215B1

(12) United States Patent
Hiraki et al.

(10) Patent No.: US 6,624,215 B1
(45) Date of Patent: Sep. 23, 2003

(54) CATIONIC ELECTRODEPOSITION PAINT COMPOSITION

(75) Inventors: Tadayoshi Hiraki, Odawara (JP);
Akira Tominaga, Chigasaki (JP);
Shigeo Nishiguchi, Hiratsuka (JP);
Reiziro Nishida, Chigasaki (JP);
Fumiaki Nakao, Toyota (JP);
Katsuhisa Sugisaki, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 09/581,316

(22) PCT Filed: Dec. 2, 1998

(86) PCT No.: PCT/JP98/05423
§ 371 (c)(1),
(2), (4) Date: Jun. 12, 2000

(87) PCT Pub. No.: WO99/31187
PCT Pub. Date: Jun. 24, 1999

(30) Foreign Application Priority Data

Dec. 12, 1997 (JP) .............................................. 9-342344
Aug. 7, 1998 (JP) ............................................ 10-234879

(51) Int. Cl.[7] ......................... C08L 63/00; C08L 33/02; C08L 75/04; C08K 3/20
(52) U.S. Cl. ...................... 523/414; 523/420; 524/556; 524/591; 502/170

(56) References Cited

U.S. PATENT DOCUMENTS

| | | | |
|---|---|---|---|
| 5,330,839 A | 7/1994 | Yasuoka et al. | 428/413 |
| 5,554,700 A | 9/1996 | Schipfer et al. | 525/360 |
| 5,670,441 A | 9/1997 | Foedde et al. | 502/200 |
| 5,702,581 A * | 12/1997 | Kerlin et al. | 204/486 |
| 5,908,912 A * | 6/1999 | Kollah et al. | 528/45 |
| 5,936,013 A | 8/1999 | Feola et al. | 523/414 |
| 6,265,079 B1 * | 7/2001 | Nishiguchi et al. | 428/457 |

FOREIGN PATENT DOCUMENTS

| | | |
|---|---|---|
| JP | 8-60046 | 3/1996 |
| WO | 93/24578 | 12/1993 |
| WO | 95/07377 | 3/1995 |

OTHER PUBLICATIONS

Derwent AN 1994–269642 "Cationic electrodeposition coating compsn . . . " Abstract of JP06200194, Jul. 19, 1994.

* cited by examiner

Primary Examiner—Matthew A. Thexton
(74) Attorney, Agent, or Firm—Wenderoth, Lind & Ponack, L.L.P.

(57) ABSTRACT

This invention relates to cationic electro-coating composition which comprises blending which an aqueous dispersion or an aqueous dispersion paste which contains an organic acid-modified bismuth compound in a non-water-soluble state, and which is obtained by mixing and grinding a bismuth compound and an organic acid in an aqueous medium. Said cationic electro-coating composition, although containing no lead compounds, is capable of forming an electrocoated film which is excellent in corrosion resistance, appearance, etc.

12 Claims, No Drawings

CATIONIC ELECTRODEPOSITION PAINT COMPOSITION

TECHNICAL FIELD

This invention relates to a cationic electro-coating composition, or, in more detail, to a cationic electro-coating composition which contains no lead compounds and is nevertheless capable of forming an electrocoated film which is excellent in corrosion resistance, appearance, etc.

BACKGROUND ART

Electropaint not only has good throwing power, but also is capable of forming a coated film which is excellent in durability and corrosion resistance. Hence, electropaint has widely been employed in fields which require these properties, e.g., in the coating of automobile body, the coating of electrical appliances, etc.

Anticorrosion agent such as lead compound and chrome compound have been blended in electropaint so as to further improve its corrosion resistance. These anticorrosion agents are very harmful, and, in view of measures against public pollution problems, it has been undesirable to use them. On this account, various studies have been made to seek non-toxic or low toxic anticorrosion agents in place of the above-mentioned lead compound and chrome compound. Now bismuth compound is known as one which exhibits excellent corrosion resistance.

For instance, Japanese Patent Application Laid-Open (Kokai) No. Hei 5 (1993)-65439 (corresponding to U.S. Pat. Nos. 5,330,839 and EP-A-509 437) proposes a cationically electrodepositable coating composition which contains bismuth compound. The use of such an electropaint gives rise to the formation of a coated film which is excellent in corrosion resistance and low temperature curability. However, when bismuth compound is not grinded uniformly enough, there occur problems that corrosion resistance and low temperature curability are insufficient, or that precipitates are apt to be produced in paint.

Japanese Patent Application National Publication No. Hei 7 (1995)-506870 (corresponding to WO 93/24578), on the other hand, discloses an electrodepositable catalyst-containing cation paint binder which contains a bismuth salt of aliphatic hydroxycarboxylic acid. This binder contains a large amount of aliphatic hydroxycarboxylic acid to retain the water-solubility of bismuth salt. Hence, an electropaint which is prepared with use of this binder has acid in excess, resulting in problems that electrocoating workability such as throwing power and film appearance markedly decreases.

In order to solve the above-mentioned problem, Japanese Patent Application Laid-Open (Kokai) No. Hei 8 (1996)-60046 (corresponding to U.S. Pat. No. 5,670,441 and EP-A-690 106) proposes to use, in combination with epoxy-amine adduct, a bismuth compound which is prepared with use of acid in such an amount as gives less than two moles of dissociative proton per mole of bismuth. Japanese Patent Application National Publication No. Hei 9 (1997)-505837 (corresponding to WO 95/07377), on the other hand, proposes to disperse, in a paint binder, a mixture of bismuthyl lactate with bismuth lactate which mixture is prepared from a reaction between bismuth oxide and lactic acid by a special method. In the former proposal, however, bismuth compound is apt to precipitate in paint, while, in the latter, the amount of acid used cannot be reduced to a full extent, resulting in a problem that thus obtained electropaint is insufficient in electrocoating workability such as throwing power and film appearance.

The inventors of this invention assiduously studied with a view to overcoming the above-mentioned problems, and, as a result, have found out that either the use of an aqueous dispersion which contains non water-soluble organic acid-modified bismuth compound which is obtained by mixing and grinding a bismuth compound together with an organic acid in an aqueous medium or the use of an aqueous dispersion paste which contains non water-soluble organic acid-modified bismuth compound which is obtained by mixing and grinding, in the presence of a dispersant, a bismuth compound together with an organic acid in an aqueous medium makes it possible to uniformly and stably disperse, in electropaint, non water-soluble organic acid-modified bismuth compound, and thus makes it possible to form, without using a lead compound etc., an electro-coated film which is excellent in both appearance and corrosion resistance. The inventors of this invention have thus completed the present invention.

DISCLOSURE OF INVENTION

This invention provides a cationic electro-coating composition which comprises blending an aqueous dispersion which contains an organic acid-modified bismuth compound in a non water-soluble state, and which is obtained by mixing and grinding a bismuth compound together with an organic acid in an aqueous medium.

This invention also provides a cationic electro-coating composition which comprises blending an aqueous dispersion paste which contains an organic acid-modified bismuth compound in a non water-soluble state, and which is obtained by mixing and grinding, in the presence of a dispersant, a bismuth compound together with an organic acid in an aqueous medium.

The cationic electro-coating composition of this invention is explained in more detail in the following.

MODE FOR CARRYING OUT THE INVENTION

Bismuth Aqueous Dispersion and Bismuth Aqueous Dispersion Paste

The aqueous dispersion (hereinafter referred to as bismuth aqueous dispersion), to be blended in the cationic electro-coating composition according to this invention, which contains non water-soluble organic acid-modified bismuth compound is produced by mixing and grinding a bismuth compound together with an organic acid in an aqueous medium. Said organic acid is used in such a proportion that non water-soluble organic acid-modified bismuth compound may be formed as a main product. Said mixing and grinding of a bismuth compound and an organic acid in an aqueous medium are desirably conducted with use of a grinding mill at a temperature of about 50° C. or lower. In this manner, there is obtained an aqueous dispersion of bismuth in which thus formed organic acid-modified bismuth compound is dispersed stably in a non water-soluble, cloudy and creamy state. When blended with an electropaint, this aqueous dispersion of bismuth remarkably improves curability and corrosion resistance without spoiling throwing power and appearance of electrocoated film.

The aqueous dispersion paste (hereinafter referred to as bismuth aqueous dispersion paste or simply aqueous dispersion paste), to be blended in the cationic electro-coating composition according to this invention, which contains non water-soluble organic acid-modified bismuth compound is produced by mixing and grinding, in the presence of a dispersant, a bismuth compound together with an organic acid in an aqueous medium. Said organic acid is used in such a proportion that non water-soluble organic acid-modified bismuth compound may be formed as a main product. If water-soluble organic acid-modified bismuth compound is produced in a large amount, bismuth becomes hard-of depositing into a coated film when electrocoated. Even though the amount of water-soluble organic acid-modified bismuth compound added is increased, sufficient corrosion resistance is hard to be obtained especially when electrocoated film has a small thickness. In this manner, there is obtained an aqueous dispersion paste of bismuth in which thus formed organic acid-modified bismuth compound is dispersed stably in a non water-soluble and cloudy state. When blended with an electropaint, this aqueous dispersion paste of bismuth remarkably improves curability and corrosion resistance without spoiling throwing power and appearance of electrocoated film.

The above-mentioned bismuth aqueous dispersion and bismuth aqueous dispersion paste may contain water-soluble bismuth compound. It is desirable, however, that the content of said water-soluble bismuth compound is such that the content of water-soluble bismuth compound which exists in supernatant obtained by centrifuging said bismuth aqueous dispersion or bismuth aqueous dispersion paste at 12000 rpm for 30 minutes may be, as metal bismuth by weight, at most about 40%, in particular at most about 30%, more desirably at most about 20%, based on the total amount of non water-soluble bismuth compound which is used as a raw material.

Examples of bismuth compound which is used for the preparation of such a bismuth aqueous dispersion or bismuth aqueous dispersion paste include basic bismuth compound such as bismuth oxide, bismuth hydroxide and basic bismuth carbonate, in which bismuth oxide is in particular suitable.

Organic acid is used for the purpose of changing the above-mentioned bismuth compound into a sufficiently uniform and stable dispersion in non water-soluble state in an aqueous medium. Examples of said organic acid include organic carboxylic acid such as formic acid, acetic acid, lactic acid and propionic acid; and organic sulfonic acid such as amidosulfonic acid. Especially preferred is aliphatic carboxylic acid which has the following formula:

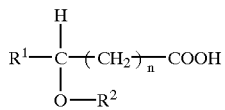

wherein $R^1$ denotes a hydrogen atom or an alkyl group having 1 to 3 carbon atoms, $R^2$ denotes a hydrogen atom or an alkyl group having 1 to 10 carbon atoms, and n denotes 0 or 1.

Concrete examples of said aliphatic carboxylic acid include aliphatic hydroxycarboxylic acid such as hydroxyacetic acid, lactic acid and hydroxypropionic acid; and aliphatic alkoxycarboxylic acid such as methoxyacetic acid, ethoxyacetic acid, 3-methoxypropionic acid, among which especially preferable are lactic acid, in particular L-lactic acid, and methoxyacetic acid. These acids may be used either singly or in combination of two or more species. Said aliphatic carboxylic acid may be used together with other organic acid mentioned above.

The above-mentioned organic acid is used in such an amount that the obtained organic acid-modified bismuth compound may be able to exist in a non water-soluble state in an aqueous medium. Although said amount varies according to the species of organic acid used, said organic acid is generally used in a molar ratio of 0.25–2.5, preferably 0.5–1.7, more desirably 0.75–1.3, based on the amount of bismuth in bismuth compound. When L-lactic acid is employed as an organic acid, it may usually be used in a molar ratio of 0.5–0.7, preferably 0.75–1.3, based on the amount of bismuth in bismuth compound. When methoxyacetic acid is employed as an organic acid, it may usually be used in a molar ratio of 0.25–2.5, preferably 0.75–1.3, based on the amount of bismuth in bismuth compound.

As a dispersant which is used for the preparation of bismuth aqueous dispersion paste, there is used a known cationic dispersion resin or surface active agent without any restriction. Said cationic dispersion resin may be appropriately selected from among those which are mentioned later as base resin for electropaint. Examples of such a cationic dispersion resin include tertiary amine type, quaternary ammonium salt type and tertiary sulfonium salt type resin. Examples of surface active agent include acetylene glycol type, polyethylene glycol type or polyhydric alcohol type nonionic surfactant whose HLB is in the range of 3–18, preferably 5–15.

The amount of the above-mentioned dispersant used may be varied according to its species or the amount of bismuth compound used or the like. Usually, however, the dispersant is used in an amount of 1–150 parts by weight, especially 10–100 parts by weight, in particular 50–100 parts by weight, based on 100 parts by weight of bismuth compound.

The preparation of bismuth aqueous dispersion with use of the above-mentioned bismuth compound and organic acid may be carried out, for instance, by adding organic acid and bismuth compound to water, and subjecting the resultant mixture to a grinding treatment in a grinding machine such as ball mill or sand mill at a temperature of about 50° C. or lower. Thus obtained aqueous dispersion may usually have a solid content of 1–50% by weight, preferably 5–30% by weight.

The preparation of bismuth aqueous dispersion paste with use of bismuth compound, organic acid and dispersant may be conducted in the same manner as in the preparation of pigment paste which is used for cationic electro paint. Concretely, it may be carried out, for instance, by adding organic acid and bismuth compound to water which contains dispersant, and subjecting the resultant mixture to a grinding treatment in a grinding machine such as ball mill or sand mill. Thus obtained aqueous dispersion paste may usually have a solid content of 10–70% by weight, preferably 30–60% by weight.

Bismuth aqueous dispersion or bismuth aqueous dispersion paste may be prepared as a pigment paste by adding pigments which are used for usual cationic electro-coating. Concretely, pigment dispersion resin, neutralizing agent and pigments, for instance, are blended, and the resultant mixture is subjected to a grinding treatment in a grinding machine such as ball mill or sand mill to prepare a pigment paste, to which the above-mentioned bismuth aqueous dispersion or bismuth aqueous dispersion paste may be added. Examples of said neutralizing agent to neutralize the above-mentioned pigment dispersion resin include organic acid such as acetic acid and formic acid.

As the above-mentioned pigment dispersion resin, any known one may be employed without restriction. Concretely, the same cationic dispersion resin as is used for the preparation of the above-mentioned bismuth dispersion paste may be employed.

As the above-mentioned pigments, any known one may be used without restriction so long as it is a pigment which is usually used for electropaint. Concrete examples include coloring pigments such as titanium oxide, carbon black and blood red; extender pigments such as clay, mica, baryta, talc, calcium carbonate and silica; and anticorrosion pigments such as aluminum phosphomolybdate and aluminum tripolyphosphate.

Bismuth aqueous dispersion or bismuth aqueous dispersion paste or a pigment paste which contains either of them may be blended in bider resin component etc. of cationic electro-coating. Bismuth aqueous dispersion may also be added after dispersing an electropaint in water.

The above-mentioned bismuth aqueous dispersion or bismuth aqueous dispersion paste may generally be blended in an electro-coating composition in such a proportion that bismuth content may fall within a range of 0.1 to 10 parts by weight, preferably 0.3 to 7 parts by weight, more desirably 0.5 to 5 parts by weight, based on 100 parts by weight of resin solid content of electropaint.

Electro-coating Composition

An electro-coating composition in which the above-mentioned bismuth aqueous dispersion or bismuth aqueous dispersion paste is blended basically comprises a cationizable base resin and, if necessary, a curing agent. Suitable examples of said base resin include epoxy-, acrylic- and polyurethane-resins which contain cationizable functional group, among which polyamine resin which is represented by amine-added epoxy resin is especially preferred in view of corrosion resistance.

Examples of the above-mentioned amine-added epoxy resin include (i) an adduct of epoxy resin with primary mono- and polyamine, secondary mono- and polyamine or with a mixture of primary and secondary polyamines (see: U.S. Pat. No. 3,984,299); (ii) an adduct of epoxy resin with secondary mono- and polyamine having ketiminized primary amino group (see: U.S. Pat. No. 4,017,438); (iii) an etherification reaction product between epoxide resin and a hydroxy compound having ketiminized primary amino group [see: Japanese Patent Application Laid-Open No. Sho 59 (1984)-430131].

The epoxy resin which is used for the production of the above-mentioned amine-added epoxy resin is a compound which has at least two epoxy groups per molecule, and which suitably has a number average molecular weight of at least 200, preferably 400 to 4000, more desirably 800 to 2000. In particular suitable are a compound obtained from a reaction between polyphenol compound and epichlorohydrin, and a compound obtained by making an adduct of polyphenol compound with alkylene oxide react with epichlorohydrin. Examples of polyphenol compound which is used for the formation of said epoxy resin include bis(4-hydroxyphenyl)-2,2-propane; 4,4-dihydroxybenzophenone; bis(4-hydroxyphenyl)-1,1-ethane; bis(4-hydroxyphenyl)-1,1-isobutane; bis(4-hydroxy-tert-butyl-phenyl)-2,2-propane; bis(2-hydroxynaphtyl)methane; tetra(4-hydroxyphenyl)-1,1,2,2-ethane; 4,4-dihydroxydiphenylsulfone; phenolic novolak; and cresol novolak.

Said epoxy resin may be a product of partial reaction with polyol, polyetherpolyol, polyesterpolyol, polyamide amine, polycarboxylic acid or polyisocyanate compound, or may be a product of graft polymerization of $\epsilon$-caprolactone, acryl monomer, etc. Furthermore, a reaction product from a reaction between polyol and epichlorohydrin, a product of reaction between said reaction product and polyphenol compound, or a product which is obtained by oxidizing an unsaturated compound with peracetic acid may be used as the above-mentioned epoxy resin.

The above-mentioned base resin may be either an external-crosslinking type or an internal (or self)-crosslinking type. As a curing agent which is used for an external-crosslinking type resin, any known crosslinking agent may be employed. Although blocked polyisocyanate compound is especially preferred, tris(alkoxycarbonylamino)triazine is also usable. An internal-crosslinking type resin has preferably blocked isocyanate groups introduced therein.

Blocked polyisocyanate compound which is usable with the above-mentioned external-crosslinking type base resin may be a product of an addition reaction between polyisocyanate compound and isocyanate blocking agent. Examples of said polyisocyanate compound include aromatic, alicyclic or aliphatic diisocyanate compound such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate and isophorone diisocyanate, and isocyanurate thereof, and further include termimally isocyanate-containing compound which is obtained by making an excess amount of said isocyanate compound react with a low molecular active hydrogen-containing compound such as ethylene glycol, propylene glycol, trimethylol propane or hexane triol.

The above-mentioned isocyanate blocking agent add to, and temporarily block, isocyanate group of polyisocyanate compound. It is desirable that blocked polyisocyanate compound which is thus formed as a result of said addition is stable at a normal temperature, and capable of reproduce a free isocyanate group by dissociating the blocking agent when heated to a baking temperature of about 100 to 200° C. Examples of blocking agent which satisfies such requirements include lactam compound such as $\epsilon$-caprolactam and $\gamma$-butyrolactam, etc.; oxime compound such as methylethyl ketoxime and cyclohexanone oxime, etc.; phenolic compound such as phenol, para-t-butyl-phenol and cresol, etc.; aliphatic alcohol such as n-butanol and -2-ethylhexanol, etc.; aromatic alkylalcohols such as phenylcarbinol and methylphenylcarbinol, etc.; and etheralcohols such as ethylene glycol monobutyl ether, among which oxime type and lactam type blocking agents, which dissociate at a considerably low temperature, are in particular preferable in view of curability of electrodeposition coating composition.

The introduction of blocked isocyanate group into a self-crosslinking type base resin which has blocked isocyanate group in the molecule of base resin may be conducted by any known method. For instance, said introduction is achieved by making a free isocyanate group in partially blocked polyisocyanate compound react with active hydrogen-containing portion of base resin.

Base resin can be rendered water-soluble or water-dispersible by neutralizing the above-mentioned base resin with a water-soluble organic acid such as aliphatic carboxylic acid, in particular acetic acid or formic acid. Acetic acid and formic acid are preferably used as a neutralizing agent since they give an electropaint which is excellent in appearance, throwing power and low temperature curability.

The electro-coating composition of the present invention may, if necessary, contain tin compound as a curing catalyst. Examples of said tin compound include organotin oxide such as dibutyl tin oxide and dioctyl tin oxide; and aliphatic or aromatic carboxylic acid salt of dialkyltin such as dibutyl tin laurate, dioctyl tin dilaurate, dibutyl tin diacetate, dioctyl tin benzoate oxy, dibutyl tin benzoate oxy, dioctyl tin dibenzoate and dibutyl tin dibenzoate. The content of tin compound in the electro-coating composition is not strictly specified, and may vary widely according to performance which is required of electropaint. Usually, however, tin compound is preferably contained so that tin content may fall within the range of 0 to 8 parts by weight, desirably 0.05 to 5 parts by weight, more desirably 0.5 to 3 parts by weight, per 100 parts by weight of resin solid content in electropaint.

The electro-coating composition of the present invention may, if necessary, contain zinc compound as an anticorrosion agent. Examples of said zinc compound include zinc phosphate, zinc formate, zinc acetate, zinc molybdate, zinc oxide and zinc phosphomolybdate. The content of zinc compound in the electro-coating composition is not strictly specified, and may vary widely according to performance which is required of electropaint. Usually, however, zinc compound is preferably contained so that zinc content may fall within the range of 0 to 8 parts by weight, desirably 0.05 to 5 parts by weight, more desirably 0.1 to 3 parts by weight, per 100 parts by weight of resin solid content in electropaint.

Furthermore, the electro-coating composition of the present invention may, if necessary, contain a paint additive such as organic solvent and surface-conditioner.

The electro-coating composition of the present invention can be applied onto the surface of a desired metal substrate by means of electrodeposition coating. Said electrodeposition coating can be conducted as follows: The electro-coating composition of the present invention is diluted with deionized water or the like so that solid content may be about 5 to 40% by weight, and is adjusted so that pH may fall within the range of 5.0 to 9.0. Thus formed electro-coating bath is normally set at a bath temperature of 15 to 35° C., and a voltage of 100 to 400 V is applied to the electro-coating bath.

The electrocoated film thickness which can be formed with use of the electrodepositable coating composition of the present invention is not restricted in particular. Preferred thickness is generally within a range of 10 to 40 μm on the basis of cured coated film. Preferable baking temperature of coated film is generally in the range of 100 to 200° C.

EXAMPLES

The present invention is hereinafter described more specifically by Examples. However, the present invention is not restricted by these Examples. "Parts" and "%" show "parts by weight" and "% by weight".

Preparation of Clear Emulsion for Cationic Electro-Coating

In a reaction vessel equipped with stirrer, thermometer, nitrogen inlet tube and reflux condenser were placed, under nitrogen atmosphere, 525 parts of propylene oxide-modified bisphenol A diglycidyl ether (*1), 342 parts of bisphenol A and 36 parts of methyl isobutyl ketone solution of the ketimine of monoethanolamine and methyl isobutyl ketone with 80% effective component and reacted at 160° C. until the epoxy group dissapears. Thereto were further added 665 parts of bisphenol diglycidyl ether with epoxy equivalent of about 190 and 232 parts of methyl isobutyl ketone solution of the ketimine of monoethanolamine and methyl isobutyl ketone with 80% effective component, which were made to react at 140° C. until epoxy group concentration became 0.27 mmol/g. Thereby an epoxy resin solution with number-average molecular weight of about 15000 was obtained.

Then it was diluted with 365 parts of ethylene glycol monobutyl ether, cooled to 100° C., and then 100 parts of methyl isobutyl ketone solution of the ketimine of monoethanolamine and methyl isobutyl ketone with 80% effective component was added thereto and reacted at 100° C. until the viscosity stopped increasing, and, thus, an epoxy-polyamine resin solution with 81% solid content was obtained. The Gardner viscosity (25° C.) was W, when the solution was adjusted with ethylene glycol monobutyl ether so that the solid content concentration became 50%.

70 Parts as resin solid content of the varnish obtained in the above, 30 parts (as solid content) of 2-ethylhexyl alcohol-blocked compound of 4,4'-diphenylmethane diisocyanate and 15 parts of 10% acetic acid were compounded, stirred uniformly and then, while strongly stirring, deionized water was added dropwise in about 15 minutes to obtain a clear emulsion for cationic electrodeposition with 33.6% solid content.

(*1) Propylene oxide-modified bisphenol A diglycidyl ether, made by Sanyo Chemical Industries, Ltd., trade name "Glyci-Ale BPP-350", epoxy equivalent about 340.

Preparation of Bismuth Aqueous Dispersion

Production Example 1

In a vessel were compounded 412 parts of deionized water and 43.1 parts of methoxyacetic acid and, after stirring the mixture to a homogeneity, 111.5 parts of bismuth oxide were added therein and mixed and dispersed by a ball mill for 20 hours to obtain a bismuth dispersion (1) with 25% solid content.

Production Example 2

The same operation as Production Example 1, except using 47.9 parts of L-lactic acid (containing 10% water) instead of 43.1 parts of methoxyacetic acid and making the amount of deionized water 407.2 parts, was conducted to obtain a bismuth dispersion (2) with 25% solid content.

Production Example 3

The same operation as Production Example 1, except using 31.9 parts of acetic acid (containing 10% water) instead of 43.1 parts of methoxyacetic acid and making the amount of deionized water 365.8 parts, was conducted to obtain a bismuth dispersion (3) with 25% solid content.

Production Example 4

The same operation as Production Example 1, except using 464.1 parts of 10% aqueous sulution of amidosulfonic acid instead of 43.1 parts of methoxyacetic acid and making the amount of deionized water 468.5 parts, was conducted to obtain a bismuth dispersion (4) with 25% solid content.

Preparation of Bismuth Aqueous Dispersion Paste

Production Example 5

In a vessel were compounded 133.3 parts of tertiary amine type epoxy resin solution for pigment dispersion (amine value 100) with 75% solid content and 81.1 parts of methoxyacetic acid and, after stirring the mixture to a homogeneity, 233.5 parts of deionized water was added therein dropwise while strongly stirring, and then 111.5 parts of bismuth oxide was further added thereto and mixed and dispersed by a ball mill for 20 hours to obtain a bismuth dispersion paste (1) with 50% solid content.

Production Example 6

The same operation as Production Example 5, except making the amount of methoxyacetic acid 59.6 parts and making the amount of deionized water 212 parts, was conducted to obtain a bismuth dispersion paste (2) with 50% solid content.

Production Example 7

The same operation as Production Example 5, except using 68.9 parts of ethoxyacetic acid instead of 81.1 parts of methoxyacetic acid and making the amount of deionized water 221.3 parts, was conducted to obtain a bismuth dispersion paste (3) with 50% solid content.

Production Example 8

The same operation as Production Example 5, except using 166.7 parts of quaternary ammonium type epoxy resin solution for pigment dispersion (quaternary ammonium salt value 50) with 60% solid content instead of 133.3 parts of tertiary amine type epoxy resin solution for pigment dispersion, making the amount of methoxyacetic acid 43.1 parts and making the amount of deionized water 162.1 parts, was conducted to obtain a bismuth dispersion paste (4) with 50% solid content.

Production Example 9

The same operation as Production Example 5, except using 50 parts of "Noigen EA-142B" (made by Dai-ichi Kogyo Seiyaku Co., Ltd., nonionic type surface-active agent, HLB=14) instead of 133.3 parts of the resin solution for pigment dispersion, making the amount of methoxyacetic acid 43.1 parts and making the amount of deionized water 178.8 parts, was conducted to obtain a bismuth dispersion paste (5) with 50% solid content.

Production Example 10

The same operation as Production Example 5, except using 66.2 parts of L-lactic acid (containing 10% water) instead of 81.1 parts of methoxyacetic acid and making the amount of deionized water 205.4 parts, was conducted to obtain a bismuth dispersion paste (6) with 50% solid content.

Production Example 11

The same operation as Production Example 10, except making the amount of L-lactic acid (containing 10% water) 90.1 parts and making the amount of deionized water 224.5 parts, was conducted to obtain a bismuth dispersion paste (7) with 50% solid content.

Production Example 12

The same operation as Production Example 10, except making the amount of L-lactic acid (containing 10% water) 54.2 parts and making the amount of deionized water 195.8 parts, was conducted to obtain a bismuth dispersion paste (8) with 50% solid content.

Production Example 13

The same operation as Production Example 10, except using 166.7 parts of quaternary ammonium type epoxy resin solution for pigment dispersion (quaternary ammonium salt value 50) with 60% solid content instead of 133.3 parts of tertiary amine type epoxy resin solution for pigment dispersion, making the amount of L-lactic acid (containing 10% water) 47.9 parts and making the amount of deionized water 157.3 parts, was conducted to obtain a bismuth dispersion paste (9) with 50% solid content.

Production Example 14

The same operation as Production Example 10, except using 50 parts of "Noigen EA-142B" (made by Dai-ichi Kogyo Seiyaku Co., Ltd., nonionic type surface-active agent, HLB=14) instead of 133.3 parts of the resin solution for pigment dispersion, making the amount of L-lactic acid (containing 10% water) 47.9 parts and making the amount of deionized water 174 parts, was conducted to obtain a bismuth dispersion paste (10) with 50% solid content.

Production Example 15

The same operation as Production Example 5, except making the amount of methoxyacetic acid 145.8 parts and making the amount of deionized water 298.1 parts, was conducted to obtain a bismuth dispersion paste (11) with 50% solid content.

Production Example 16

The same operation as Production Example 10, except making the amount of L-lactic acid (containing 10% water) 114.1 parts and making the amount of deionized water 243.6 parts, was conducted to obtain a bismuth dispersion paste (12) with 50% solid content.

Bismuth dispersion and bismuth dispersion paste obtained in the above were each centrifuged (12000 rpm for 30 minutes) and the bismuth metal concentration in the supernatant was measured and Bi content was calculated by the following formula.

$$\text{Bi content (\%)} = \frac{\text{Measured amount of Bi metal in supernatant}}{\text{Compounded (theoritical) amount of Bi metal}} \times 100$$

The results are shown in the following Table 1. Sediments after centrifugation of each bismuth dispersion and bismuth dispersion paste were all white fine powder and could be dispersed again by adding water.

TABLE 1

|  | Bismuth aqueous dispersion | | | | Bismuth dispersion paste | | | | | | | | | | | |
| --- | --- | --- | --- | --- | --- | --- | --- | --- | --- | --- | --- | --- | --- | --- | --- | --- |
|  | (1) | (2) | (3) | (4) | (1) | (2) | (3) | (4) | (5) | (6) | (7) | (8) | (9) | (10) | (11) | (12) |
| Bi content in supernatant (%) | 5 | 3 | 3 | 3 | 26 | 14 | 13 | 10 | 11 | 13 | 29 | 7 | 10 | 9 | 98 | 87 |

Preparation of Pigment Dispersion Paste

Preparation Example 1

After 4.7 parts of 75% tertiary amine type epoxy resin solution for pigment dispersion and 10.6 parts of 50% bismuth dispersion paste (1) prepared in the above were added and mixed in a ball mill, 23.4 parts of deionized water was further added thereto, mixed and stirred. Then 16.5 parts of titanium white, 8 parts of clay, 0.3 parts of carbon black and 3 parts of dioctyltin oxide were added therein and grinded for 40 hours to give a pigment dispersion paste (P-1) with 55% solid content.

Preparation Examples 2–16

Pigment dispersion pastes (P-2)-(P-16) were obtained by the same operation as Preparation Example 1, except that the compositions shown in the following Table 2 were used as compounding components.

Preparation Examples 17 and 18

After 4.7 parts of 75% tertiary amine type epoxy resin solution for pigment dispersion and 1.4 parts of 10% formic acid were added and mixed in a ball mill, deionized water was further added thereto, mixed and stirred. Then 16.5 parts of titanium white, 8 parts of clay, 0.3 parts of carbon black and 3 parts of dioctyltin oxide, and, in case of Preparation Example 18, further 2 parts of bismuth oxide, were added thereto and grinded for 40 hours to give pigment dispersion pastes (P-17) and (P-18) with 55% solid content. (cf the following Table 2)

Examples and Comparative Examples

To the above-mentioned clear emulsion for cationic electrodeposition, each pigment paste prepared in the above according to the formulation shown in the following Table 3 was added, diluted with deionized water and stirred to give a cationic electro-coating with 20% solid content.

Coating Test

A dull finished cold rolled steel plate of 0.8×150×70 mm without chemical treatment (untreated plate) and a dull finished cold rolled steel plate of the same size which was chemically trated with Palbond #3080 (made by Nihon Parkerizing Company, zinc phosphate treating agent) (chemically treated plate) was dipped respectively in each cationic electro-coating obtained in the above-mentioned Examples and Comparative Examples, and electrodeposition coating was conducted by using the plate as cathode. An electrodeposition coating film with a film thickness (based upon a dried film thickness) of about 20 $\mu$m was formed under the electrodeposition condition of a voltage of 200 V, washed with water and then baked. Baking was conducted in 2 kinds of atmospheric temperatures and for 20 minutes baking time by using an electric hot air drier. Performance test results of the obtained coated plates are shown in the following Table 3.

TABLE 2

| | Preparation of pigment dispersion paste | | | | | | | | | |
|---|---|---|---|---|---|---|---|---|---|---|
| | 1 | 2 | 3 | 4 | 5 | 6 | 7 | 8 | 9 | 10 |
| Pigment dispersion paste Composition | P-1 | P-2 | P-3 | P-4 | P-5 | P-6 | P-7 | P-8 | P-9 | P-10 |
| 75% Tertiary amine type epoxy resin solution for pigment dispersion | 4.7 | 4.7 | 4.7 | 4.7 | 4.7 | 4.7 | 4.7 | 4.7 | 4.7 | 4.7 |
| 50% Bismuth dispersion paste | | | | | | | | | | |
| kind | (1) | (2) | (3) | (4) | (5) | (6) | (7) | (8) | (9) | (10) |
| amount | 10.6 | 9.1 | 11.2 | 10.6 | 7.3 | 9.1 | 9.9 | 8.7 | 9.1 | 7.3 |
| 25% Bismuth dispersion | | | | | | | | | | |
| kind | | | | | | | | | | |
| amount | | | | | | | | | | |
| 10% Formic acid | 1.4 | 1.4 | 1.4 | 1.4 | 1.4 | 1.4 | 1.4 | 1.4 | 1.4 | 1.4 |
| Titanium white | 16.5 | 16.5 | 16.5 | 16.5 | 16.5 | 16.5 | 16.5 | 16.5 | 16.5 | 16.5 |
| Clay | 8 | 8 | 8 | 8 | 8 | 8 | 8 | 8 | 8 | 8 |
| Carbon black | 0.3 | 0.3 | 0.3 | 0.3 | 0.3 | 0.3 | 0.3 | 0.3 | 0.3 | 0.3 |
| Dioctyltin oxide | 3 | 3 | 3 | 3 | 3 | 3 | 3 | 3 | 3 | 3 |
| Bismuth oxide | | | | | | | | | | |

| | Preparation of pigment dispersion paste | | | | | | | |
|---|---|---|---|---|---|---|---|---|
| | 11 | 12 | 13 | 14 | 15 | 16 | 17 | 18 |
| Pigment dispersion paste Composition | P-11 | P-12 | P-13 | P-14 | P-15 | P-16 | P-17 | P-18 |
| 75% Tertiary amine type epoxy resin solution for pigment dispersion | 4.7 | 4.7 | 4.7 | 4.7 | 4.7 | 4.7 | 4.7 | 4.7 |
| 50% Bismuth dispersion paste | | | | | | | | |
| kind | | | | | (11) | (12) | | |
| amount | | | | | 12.1 | 12.1 | | |
| 25% Bismuth dispersion | | | | | | | | |
| kind | (1) | (2) | (3) | (4) | | | | |
| amount | 9.9 | 9.9 | 9.1 | 10.1 | | | | |
| 10% Formic acid | 1.4 | 1.4 | 1.4 | 1.4 | 1.4 | 1.4 | 1.4 | 1.4 |
| Titanium white | 16.5 | 16.5 | 16.5 | 16.5 | 16.5 | 16.5 | 16.5 | 16.5 |
| Clay | 8 | 8 | 8 | 8 | 8 | 8 | 8 | 8 |
| Carbon black | 0.3 | 0.3 | 0.3 | 0.3 | 0.3 | 0.3 | 0.3 | 0.3 |
| Dioctyltin oxide | 3 | 3 | 3 | 3 | 3 | 3 | 3 | 3 |
| Bismuth oxide | | | | | | | | 2 |

Performance tests were conducted according to the following methods.

(*1) Curability:

The coating surface of each electro-coated plate, obtained by baking at 150° C., was rubbed 20 times back and forth for about 3–4 cm length with 4-fold gauze soaked with methyl isobutyl ketone, and then the appearance of the coating surface was visually observed and evaluated according to the following standard.

○: No scratch is observed on the coating surface.

Δ: Scrathes are observed on the coating surface but the ground surface is not seen.

×: Coating film dissolves and the ground surface is seen.

(*2) Corrosion resistance:

Cross-cut lines were cut in the electrodeposition coating film on each electro-coated plate, obtained by baking at 170° C., with a knife reaching to the ground surface, to which salt water spray tests according to JIS Z-2371 were conducted for 480 hours on the untreated plate and for 840 hours on the chemically treated plate, and evaluated by the rust and blister width from the knife scratch according to the following standard.

◎: Maximum width of rust or blister is less than 1 mm from the cut part (one side).

○: Maximum width of rust or blister is more than 1 mm and less than 2 mm from the cut part (one side).

Δ: Maximum width of rust or blister is more than 2 mm and less than 3 mm from the cut part (one side) and blistering is rather remarkable at the flat part.

×: Maximum width of rust or blister is more than 3 mm from the cut part and blistering is seen all over the coating surface.

(*3) Thin film corrosion resistance:

Electrodeposition coating film with a film thickness (based upon a dried film thickness) of about 10 $\mu$m was prepared under the electrodeposition condition of a voltage of 100V at the time of test plate preparation, to which the same test as the above-mentioned (*2) corrosion resistance (however, 240 hours on the untreated plate and 480 hours on the chemically treated plate) was conducted, and the corrosion resistance was evaluated according to the same standard as the above-mentioned (*2).

(*4) Impact resistance:

Using a DuPont impact test machine under the condition of a diameter of impact point ½ inches, weight falling height 50 cm, measurement atmosphere 20° C., the test was conducted on each electro-coated plate obtained by baking at 170° C., and concave portion of made by the impact was visually evaluated.

○: No abnormality is observed.

Δ: A little fine cracks are observed.

×: Big cracks are observed.

(*5) Box method throwing power:

Test pieces for box method throwing power (*) was dipped in an electro-coating bath, so that the dipping depth might be 90 mm, that distance to the opposite electrode might be 110 mm and that the surface with 8 mm$\phi$ holes might face the opposite electrode, and thus the test pieces was electro-coated. The film thickness of the electro-coating film at the inner side of the steel plate without holes, corresponding to the inner surface of the box-shaped body, among the four steel plates as said test pieces placed in parallel is expressed in the ratio (%) to the film thickness of the electro-coating film at the outer side of the steel plate nearest to the opposite electrode, corresponding to the outer surface of the box-shaped body, among the steel plates with holes forming the box-shaped body. Higher ratio means better box method throwing power.

(*) Test pieces for box method throwing power:

Holes of 8 mm$\phi$ were symmetrically made at 45 mm from the bottom on the three of four zinc phosphated cold rolled steel plates of 70×150×0.8 mm. The four steel plates were placed in parallel at the same distance to form a box-shaped body of 70×150×60 mm, whose side surfaces and bottom surface were closed with zinc phosphated cold rolled steel plates while upper side was left open. Steel plate without hole among the four steel plates was placed to form an outer surface of the body. The obtained box-shaped body was dipped to the depth of 90 mm at the time of the electro-coating, the electro-coating paint passing only through the 8 mm$\phi$ holes.

(*6) Zinc-plated steel plate coatability Current application was conducted at 250V for 3 minutes to a steel plate, which had been plated with alloyed molten zinc, and the appearance of the coating film after baking was visually evaluated.

○: No abnormality is observed.

Δ: Pinholes generate slightly.

×: Pinholes generate remarkably.

TABLE 3

| | Example | | | | | | | | | |
|---|---|---|---|---|---|---|---|---|---|---|
| | 1 | 2 | 3 | 4 | 5 | 6 | 7 | 8 | 9 | 10 |
| Paint composition | | | | | | | | | | |
| 33.6% Clear emulsion for cationic electro-coating (parts) | 298 | 298 | 298 | 298 | 298 | 298 | 298 | 298 | 298 | 298 |
| Pigment-paste | | | | | | | | | | |
| kind | P-1 | P-2 | P-3 | P-4 | P-5 | P-6 | P-7 | P-8 | P-9 | P-10 |
| amount (parts) | 66.5 | 65.0 | 67.0 | 66.5 | 63.2 | 65.0 | 65.8 | 64.6 | 65.0 | 63.2 |
| 25% Bismuth aqueous dispersion | | | | | | | | | | |
| kind | | | | | | | | | | |
| amount (parts) | | | | | | | | | | |
| Curability (baking temperature 150° C.)(*1) | ○ | ○ | ○ | ○ | ○ | ○ | ○ | ○ | ○ | ○ |
| Corrosion resistance(*2) | | | | | | | | | | |

TABLE 3-continued

| | | | | | | | | | | |
|---|---|---|---|---|---|---|---|---|---|---|
| (baking temperature 170° C.) | | | | | | | | | | |
| untreated plate | ○ | ○ | ○ | ○ | ○ | ○ | ○ | ○ | ○ | ○ |
| chemically treated plate | ⊚ | ⊚ | ⊚ | ⊚ | ⊚ | ⊚ | ⊚ | ⊚ | ⊚ | ⊚ |
| Thin film corrosion resistance[*3] | | | | | | | | | | |
| (baking temperature 170° C.) | | | | | | | | | | |
| untreated plate | ○ | ○ | ○ | ○ | ○ | ○ | ○ | ○ | ○ | ○ |
| chemically treated plate | ⊚ | ⊚ | ⊚ | ⊚ | ⊚ | ⊚ | ⊚ | ⊚ | ⊚ | ⊚ |
| Impact resistance[*4] | ○ | ○ | ○ | ○ | ○ | ○ | ○ | ○ | ○ | ○ |
| Box method throwing power (%)[*5] | 35 | 40 | 41 | 39 | 40 | 41 | 34 | 41 | 39 | 40 |
| Zn-plated steel plate coatability[*6] | ○ | ○ | ○ | ○ | ○ | ○ | ○ | ○ | ○ | ○ |

| | Example | | | | | | Comparative example | | | |
|---|---|---|---|---|---|---|---|---|---|---|
| | 11 | 12 | 13 | 14 | 15 | 16 | 1 | 2 | 3 | 4 |
| Paint composition | | | | | | | | | | |
| 33.6% Clear emulsion for cationic electro-coating (parts) | 298 | 298 | 298 | 298 | 298 | 298 | 298 | 298 | 298 | 298 |
| Pigment paste | | | | | | | | | | |
| kind | P-11 | P-12 | P-13 | P-14 | P-17 | P-17 | P-15 | P-16 | P-17 | P-18 |
| amount (parts) | 76.5 | 76.5 | 76.3 | 76.6 | 70.1 | 70.1 | 68.0 | 68.0 | 56.9 | 60.6 |
| 25% Bismuth aqueous dispersion | | | | | | | | | | |
| kind | | | | | (1) | (2) | | | | |
| amount (parts) | | | | | 9.9 | 9.9 | | | | |
| Curability (baking temperature 150° C.)[*1] | ○ | ○ | ○ | ○ | ○ | ○ | ○ | ○ | Δ | Δ |
| Corrosion resistance[*2] | | | | | | | | | | |
| (baking temperature 170° C.) | | | | | | | | | | |
| untreated plate | ○ | ○ | ○ | ○ | ○ | ○ | ○ | ○ | Δ | Δ |
| chemically treated plate | ⊚ | ⊚ | ⊚ | ⊚ | ⊚ | ⊚ | ⊚ | ⊚ | Δ | Δ |
| Thin film corrosion resistance[*3] | | | | | | | | | | |
| (baking temperature 170° C.) | | | | | | | | | | |
| untreated plate | ○ | ○ | ○ | ○ | ○ | ○ | Δ | Δ | Δ | Δ |
| chemically treated plate | ⊚ | ⊚ | ⊚ | ⊚ | ⊚ | ⊚ | ○ | ○ | ○ | Δ |
| Impact resistance[*4] | ○ | ○ | ○ | ○ | ○ | ○ | ○ | ○ | Δ | Δ |
| Box method throwing power (%)[*5] | 40 | 40 | 39 | 42 | 40 | 41 | 17 | 25 | 40 | 41 |
| Zn-plated steel plate coatability[*6] | ○ | ○ | ○ | ○ | ○ | ○ | X | Δ | ○ | ○ |

What is claimed is:

1. A cationic electro-coating composition which is characterized by blending an aqueous dispersion which contains an organic acid-modified bismuth compound in a non-water-soluble state, and which is obtained by mixing and grinding a bismuth compound together with an organic acid in an aqueous medium.

2. A cationic electro-coating composition which is characterized by blending an aqueous dispersion paste which contains an organic acid-modified bismuth compound in a non water-soluble state, and which is obtained by mixing and grinding, in the presence of a dispersant, a bismuth compound together with an organic acid in an aqueous medium.

3. A cationic electro-coating composition of claim 1 or 2 wherein bismuth compound is selected from bismuth oxide, bismuth hydroxide and basic bismuth carbonate.

4. A cationic electro-coating composition of claim 1 or 2 wherein bismuth compound is bismuth oxide.

5. A cationic electro-coating composition of claim 1 or 2 wherein organic acid is selected from organic carboxylic acid and organic sulfonic acid.

6. A cationic electro-coating composition of claim 1 or 2 wherein organic acid is aliphatic carboxylic acid which has the following formula:

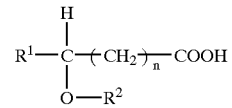

wherein $R^1$ denotes a hydrogen atom or an alkyl group having 1 to 3 carbon atoms, $R^2$ denotes a hydrogen atom or an alkyl group having 1 to 10 carbon atoms, and n denotes 0 or 1.

7. A cationic electro-coating composition of claim 5 wherein aliphatic carboxylic acid is L-lactic acid or methoxyacetic acid.

8. A cationic electro-coating composition of claim 1 or 2 which comprises mixing and grinding organic acid is a molar ratio of 0.25–2.5, based on the amount of bismuth in bismuth compound.

9. A cationic electro-coating composition of claim 8 which comprises mixing and grinding organic acid in a molar ratio of 0.5–1.7, based on the amount of bismuth in bismuth compound.

10. A cationic electro-coating composition of claim 2 wherein the dispersant is selected from cationic dispersion resin and nonionic surface active agent.

11. A cationic electro-coating composition of claim 1 which comprises blending the aqueous dispersion so that bismuth content may fall within a range of 0.1 to 10 parts by weight, based on 100 parts by weight of resin solid content of electropaint.

12. A cationic electro-coating composition of claim 2 which comprises blending the aqueous dispersion paste so that bismuth content may fall within a range of 0.1 to 10 parts by weight, based on 100 parts by weight of resin solid content of electropaint.

* * * * *